PERIODICAL CONTAINING COUPONS AND METHOD OF PROCESSING THEREOF

Original Filed Nov. 24, 1961 3 Sheets-Sheet 1

INVENTORS.
RAYMOND P. FISCHER
EMIL B. TERILLI
BY Parker & Carter
Attorneys.

PERIODICAL CONTAINING COUPONS AND METHOD OF PROCESSING THEREOF

Original Filed Nov. 24, 1961 3 Sheets-Sheet 2

INVENTORS.
RAYMOND P. FISCHER
EMIL B. TERILLI
BY Parker & Carter
Attorneys.

PERIODICAL CONTAINING COUPONS AND METHOD OF PROCESSING THEREOF

Original Filed Nov. 24, 1961 3 Sheets-Sheet 3

INVENTOR
RAYMOND P. FISCHER
EMIL TERRILI
BY Parker & Carter
Attorneys.

United States Patent Office

Re. 26,049
Reissued June 28, 1966

26,049

PERIODICAL CONTAINING COUPONS AND METHOD OF PROCESSING THEREOF

Raymond P. Fischer, Chicago, Ill., and Emil B. Terilli, New York, N.Y., assignors to The Cuneo Press Inc., Chicago, Ill., a corporation of Illinois Original No. 3,108,824, dated Oct. 29, 1963, Ser. No. 157,036, Nov. 24, 1961. Application for reissue Oct. 23, 1965, Ser. No. 505,144
6 Claims. (Cl. 283—56)

Figure 1:
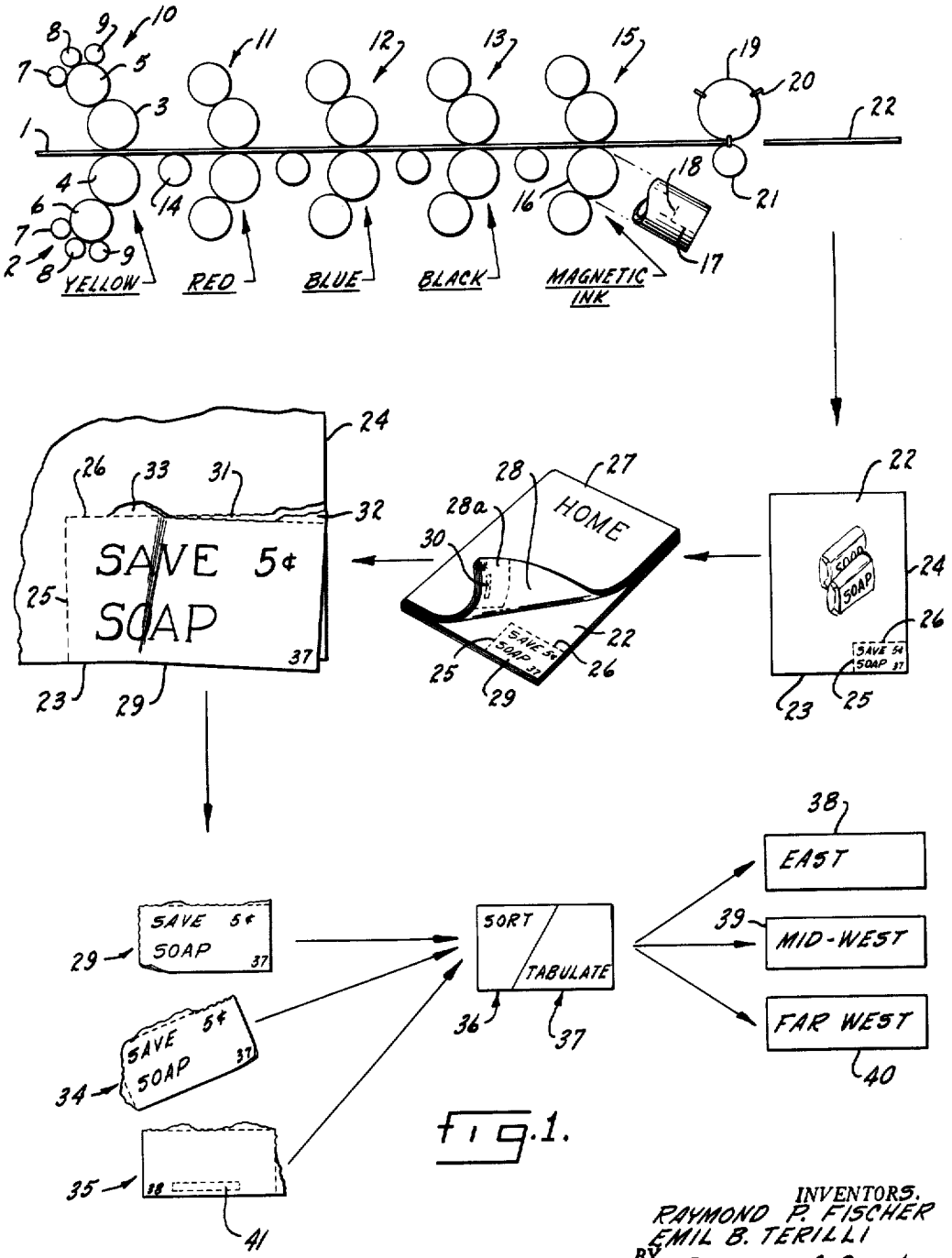

Matter enclosed in heavy brackets [ ] appears in the original patent but forms no part of this reissue specification; matter printed in italics indicates the additions made by reissue.

This invention relates in general to the processing of coupons. Specifically, the invention relates to a method of processing coupons printed on standard weight paper stock formed as an integral portion of a periodical sheet, and an article employed in said method.

Redeemable advertising coupons have come into increasingly widespread use in recent years as a means for promoting the sale of a variety of products. It has now become quite common for large manufacturing concerns, such as soapmakers, to mail advertising messages directly to individual addresses. The advertising material generally includes a flyer or pamphlet describing the product and a plurality of coupons. As a general rule each coupon, when exchanged at a proper location such as a food store, entitles the bearer to receive a cash discount on goods purchased at the store. These coupons are generally printed on relatively heavy weight paper stock, such as 100 pound stock, and are formed to very precise dimensions. For example, when punched coupons are distributed, the side dimensions must often be maintained to within plus or minus .005 of an inch in order to enable the coupon, after exchange, to be properly processed. A considerable variety of information can be obtained from such coupons.

The costs involved in direct mail advertising are extremely large. Separate listings must be maintained and of course, there is considerable expense in preparing and forwarding such direct mail advertising material.

Another method of bringing advertising messages to a widely distributed public is to print coupons on the pages of a periodical. Such a procedure eliminates the expense of maintaining separate lists and performing a separate mailing function. Although the initial distribution problem is considerably reduced as contrasted to direct mail, punched card type of advertising, the subsequent processing costs are considerably increased. Heretofore, the coupons have merely been printed on the pages of the periodical in a conventional manner and it is up to the periodical reader to detach the coupon along a printed line and turn it in. In view of the irregularities of the coupon resulting from its being torn out by a reader, it is therefore necessary to manually sort the coupons after collection at a central location in order to properly segregate the coupons relating to a given product of a given supplier so that succeeding tabulating operations and financial reimbursements can be made. Because the coupons must be visually inspected to ascertain to what products and companies they relate, it has not been feasible heretofore to obtain much information other than the product and the companies supplying those products. Because of the manual labor involved and consequent high processing costs and long time delays, this method of distributing coupons has not come in to widespread use on nationally distributed low cost products such as food and other household products.

In order to obtain the information yielding advantages of the punched card system with the low distribution costs of the periodical distribution method, it has become common practice to incorporate punched cards into periodicals. This, however, is a costly procedure because, due to the difference in weight of the coupon paper stock, the coupons must be separately printed and separately bound into the eventual periodical. In addition, due to the particular characteristics of the heavy stock used for the coupons, their manufacturing speed is considerably slower than the standard printing speeds used in printing periodicals. As a result, due to the speed of printing difference production problems result. Another drawback is the increased cost resulting from the separate binding operations.

Accordingly, a primary object of this invention is to provide a method of processing quickly, economically and efficiently extremely large quantities of coupons containing as much or more information as now obtainable through the use of any existing process.

Another object of the invention is to eliminate the need for separately printing and punching conventional punched indicia coupons and the subsequent cost of binding the separately punched coupons into periodicals.

Another object is to provide a method of printing coupons on selected paper stock which can be used in assembling a complete periodical or similar publication.

Another object is to provide a method of processing coupons, such as advertising coupons and the like, in which the coupons are printed as an integral portion of a periodical so that printing of the periodical can be done at standard printing speeds.

Another object is to provide a method of processing coupons which is independent of visual checking or manual handling of the coupons during sorting and tabulation.

Another object is to provide a method of processing large quantities of advertising coupons having roughened or irregularly shaped edges.

Another object is to provide, as a new article of commerce, a periodical sheet having machine-translatable information on a severable portion thereof.

Another object is a method of processing coupons on selected paper sheets, which sheets can then be bound in periodicals or similar publications.

Other objects and advantages of the invention will become obvious upon a reading of the following description of the invention.

Figure 2:
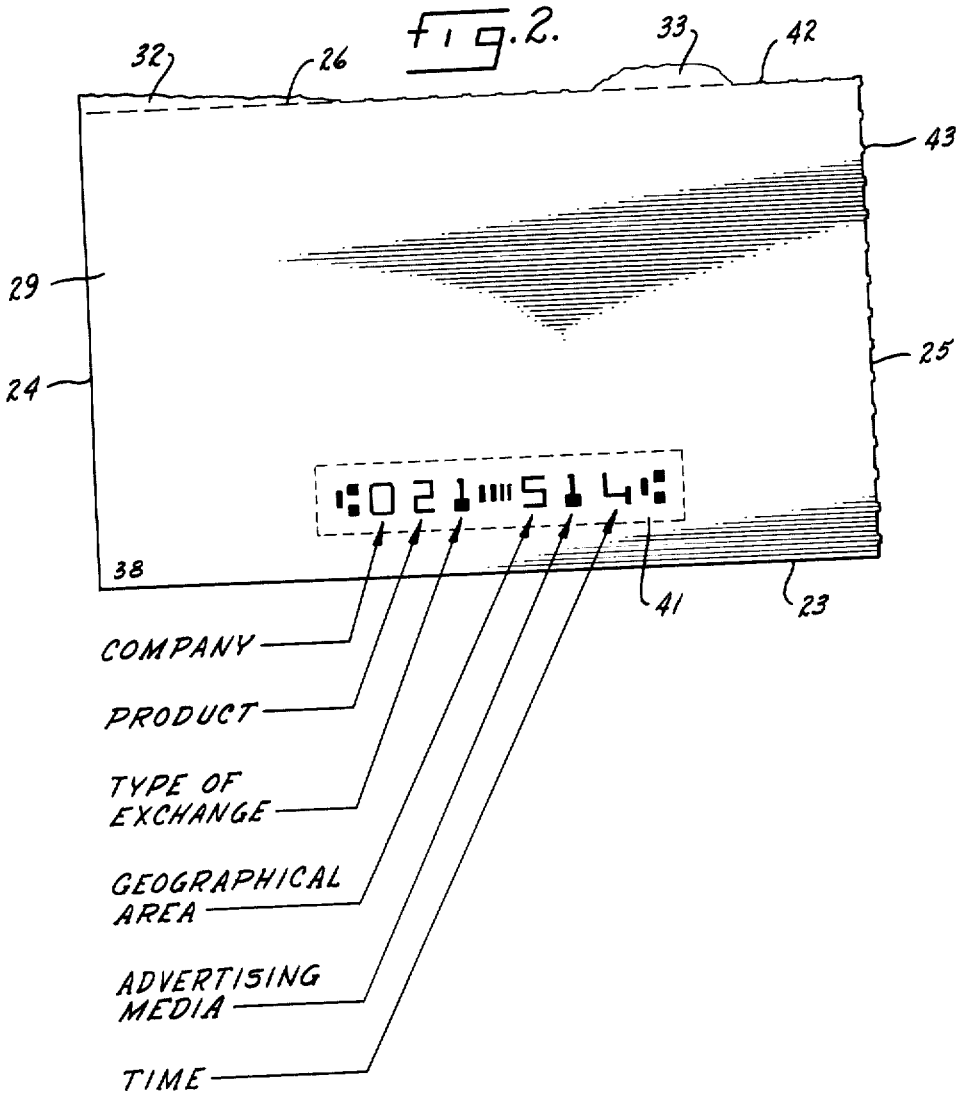
Figure 3:
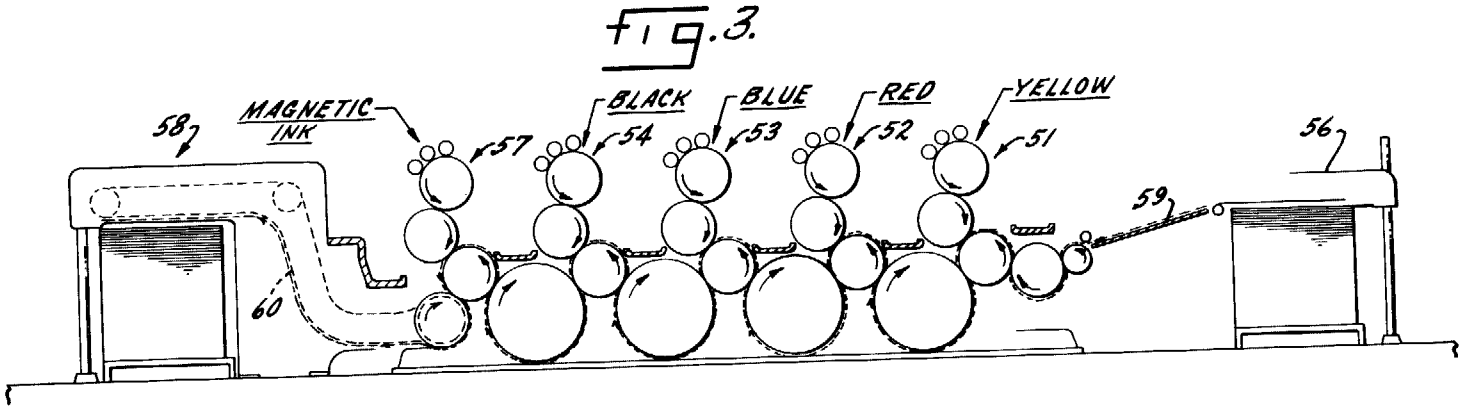

The invention is illustrated more or less diagrammatically in the accompanying drawings wherein:

FIGURE 1 illustrates more or less diagrammatically the method and article of the invention, FIGURE 2 illustrates the type of information derivable from a typical coupon utilized in the method illustrated in FIGURE 1, and FIGURE 3 illustrates an alternate process for printing single sheet articles.

Like reference numerals will be used to refer to like parts throughout the following description of the drawings.

Referring first to FIGURE 1, a web of conventional weight paper stock is indicated generally at 1 passing through an ordinary offset printing process indicated generally at 2. In this instance, a series of five clusters of rollers have been shown. Although the offset printing process has been described for purposes of illustration, the invention is not so limited for it is contemplated that other conventional processes may be just as readily employed.

The weight and character of the printing paper contributes significantly to the success of the process for reasons which will be described fully. It is preferred that the weight of the paper, in the language of the industry, be 40 pounds stock or more than 40 pounds stock. Such weight units particularly refer to a ream of 500 sheets, each sheet of 25 inches x 38 inches. The weight of the paper does not affect the printing or the laying down of the coupons impressed on the sheet in any way, but the weight is of importance in the subsequent sorting of such coupons. In particular, the various sorters now in use operate more efficiently and smoothly with paper of the described weight.

The first set of rollers includes a pair of upper and lower rubber plate cylinders 3 and 4 which are contacted by a pair of plate cylinders 5 and 6. A plurality, in this instance three, inking rollers 7, 8 and 9 contact each of the plate cylinders along about one third of the circumference of the plate cylinders. Ink is transferred from a suitable source (not shown) to the inking rollers; from there to the plate cylinders; and from there to the rubber plate cylinders and on to the traveling web. The first group of rollers, indicated generally at 10, prints yellow ink, the second group, 11, prints red, the third, 12, blue, and the fourth 13, black. It will be helpful in visualizing the invention to assume that a full page colored advertisement of a soap is being prepared. Conventional idler rollers 14 support the traveling web between adjacent clusters of offset printing rollers.

In this instance, a fifth set, 15, of offset rollers has been illustrated. This set impresses machine-translatable indicia onto the traveling web. In this instance, the roller cluster 15 places magnetic ink on what will eventually be a defined area on each full page advertisement. For purposes of illustration, the inking rollers 7, 8 and 9 have been left off the last four roller clusters. It will be understood that the actual mechanical operation of printing magnetic ink on the traveling web will be the same as for printing the colors.

The bottom upper plate cylinder 16 in the magnetic ink cluster carries a series of serrations or sharp teeth similar to the teeth of a hack saw blade which form perforations in the traveling web. In this instance, the teeth are arranged in the shape of an L, the longer leg of which is indicated at 17 and the short leg at 18.

After printing and perforating, the web travels to a cutting cylinder 19 which carries a series of blades 20 on its periphery. As the cutting cylinder 19 rotates against the backup cylinder 21, the web is separated into sheets 22.

The separated, perforated sheet is adapted to be bound into a periodical, such as one of the weekly or monthly magazines having nationwide distribution. In this instance, sheet 22, which is intended to be bound into a periodical as pages 37 and 38, carries a full page advertisement describing a hand soap. In the lower right-hand corner, that is, the corner bounded by bottom edge 23 and forward edge 24, a separable coupon defined by the perforations 25, 26 is illustrated.

During the next stage of the process, sheet 22 along with all the other individual sheets are properly bound into magazine form. In the particular magazine 27 illustrated, the preceding sheet 28, that is, the sheet containing pages 35 and 36, a similar coupon **28*a* has been formed. The face of the coupon (not shown) is printed on page 35 but the coded magnetic indicia impressed on the back of the coupon during the printing process as described hereinabove are indicated at 30**.

During the next stage in the process, the coupon is torn from page 37 along the perforations 25 and 26. Although the perforation has been shown as extending substantially perpendicularly inwardly from two adjacent edges 23 and 24, it will be understood that within the scope of the invention it is entirely feasible to use a single perforation extending from edge 23 to 24 in a straight or curved path. In essence, nearly any particular perforation arrangement can be used so long as it facilitates the removal of the coupon from the page. As illustrated, the coupon has torn smoothly along that portion of the perforation indicated at 31 but a jagged edge has been formed at 32 and 33.

A plurality of coupons 23, 34 and 35 is then collected and run through a sorting and tabulating operation indicated generally at 36 and 37. During this operation, the coupons are first sorted by means of the magnetic indicia on the back side and then the information is tabulated. A single machine may be used to both sort the coupons and then tabulate the result. Since the details and functioning of the machine used for the sorting and tabulating operations does not form an integral part of the invention, it is not further illustrated. Suffice to say that suitable machines responsive to the magnetic indicia may be utilized to both sort and tabulate.

FIGURE 3 illustrates an alternate method for printing coupon sheets, and this method presents particular advantages. It has been found that paper of a certain weight is preferred for printing the coupons thereon because such paper is more efficiently handled in the sorter. It has also been found that the sorter handles the coupons more efficiently when the grain of the paper is parallel with the long dimension of the coupon. When the grain of the paper is otherwise disposed, the paper tends to wrinkle or clog in the sorting equipment. To provide the grain in the desired direction, it is possible to place the coupon on ordinary printing stock paper so that the coupon is printed with its long dimensions oriented towards the top and bottom of a printed page. The process illustrated in FIGURE 1 can then be used to full advantage, that is, a roll of paper stock can be fed as a web between opposed impression rollers. It will be realized that there is some disadvantage from a reader point of view in having to turn the magazine page on the side to read the legend on the face of the coupon. Pleasing the potential consumer or customer has a compelling purpose in merchandising and, therefore, it is preferred that the coupon be placed on the page so that its long dimension is oriented to the right-hand and left-hand sides of the page. This advantage is realized by using a sheet fed press as illustrated diagrammatically in FIGURE 3 to print individual sheets of selected paper having the grain running from the left side to the right side of the page or parallel to the long dimension of the coupon positioned on a lower corner of the page. Such conventional sheet fed presses can print sheets at the rate of 1500 per minute.

The sheet fed press generally prints one side of a sheet at a time or picks up a particular color at roller assemblies 51, 52, 53 and 54. The components of an individual assembly are the same as depicted and described in FIGURE 1. The sheets are transferred from a feeder 56 to the first roller assembly 51 along a platform 59. The paper is delivered along the feed press as indicated by the broken line of travel. The last roller assembly 57 deposits the magnetic ink indicia on the paper and the sheet is then transferred to the delivery bin 58 along traveling belt 60. Such sheets are later bound in their proper place in a periodical or similar publication. In the finally assembled periodical or publication, the sheets with the advertising coupons will have horizontally oriented grain whereas the remainder of the sheets may have vertically oriented grain.

As an example of one type of information which can be gleaned from the coupons by the sorting and tabulating steps, three bins are indicated diagrammatically at 38, 39 and 40 as representing different sections of the country. In other words, periodicals intended for distribution in States east of Ohio may have one code indicia on the reverse sides, States between Iowa and Ohio another coded symbol, and States west of the Rocky Mountains another coded symbol. The type of information and the results obtained are more clearly illustrated and described in FIGURE 2.

In FIGURE 2, the reverse side of coupon 29 of FIGURE 1 is illustrated in more detail. The coupon has been illustrated as it might appear after having been removed from the lower corner of a periodical, as just described. It should also be understood that although the area containing the magnetic indicia appears on the reverse side from the full page advertisement, it is just as feasible to place the indicia on the face of the coupon. Since the coupon forms the lower portion of page 38, any suitable advertising or other printed matter may appear on that page. As a practical matter, since an advertiser may not buy both pages on a sheet, it is convenient to confine the coded magnetic indicia to a defined area close to the bottom of the coupon. In this instance, the defined area is indicated generally by the dotted lines at 41. It is to be understood that the dotted lines are merely for purposes of illustration and in the final coupon no outlining of any sort will appear.

The subject matter disclosed herein can find general use and acceptance in periodicals of general publication wherein a single redeemable coupon is incorporated on a page of advertising. Other types of publications, however, can use the process and articles shown here to great advantage. In particular, a catalog or the type of publication issued by mail order houses, for example, can list various commodities for sale and also provide printed coupons of the type disclosed herein to order such commodities. A bound publication can be provided wherein various commodities are advertised or shown printed on one type of paper which may be of lesser weight, may have its grain oriented vertically and may even be coated. A plurality of coupons can be printed on another type of paper which is of the preferred weight, has its grain oriented in the preferred direction and is uncoated. The "coating" refers to paper commonly known in the industry, which paper has clay, starch or similar materials finely spread over the surface. Such coated paper can possibly form a dust from the finely divided material, and this dust would be a disadvantage when coated papers were processed in the electric sorters.

A plurality of coupons preferably printed on desired type of paper may comprise a substantial portion of the printed sheet or may be printed, with suitable perforations, on all of the available space of such sheet.

Within the defined area, a variety of information may be imprinted. For example, in the specimen shown, six separate information spaces have been indicated. These information spaces are separated at their midpoint by a series of spaces or dots. The first space may represent, for example, the company which manufactures and sells the product being advertised. Since any given periodical may carry ads and coupons of a multitude of different advertisers, some means must be provided whereby the different companies may be distinguished.

In the second place, the product to which the coupon relates is indicated. Since the sorting and tabulating operations are never carried out visually, it is essential that the same message which, in effect, appears as a part of the printed page be somehow reproduced by the coded magnetic indicia to furnish a basis upon which the electronic sorting processing can later be used.

In the third space, the type of exchange may be indicated. For example, a coupon may be worth a given amount of cash or a single article can be purchased at a reduced price if accompanied by a coupon.

In the fourth space, the geographical area from which the coupon comes is indicated. In a magazine of nationwide distribution, for example, the country may be divided into a number of areas corresponding to the company's sales districts or any other suitable subdivision.

In the fifth space, the advertising media from which the coupon originates may be indicated. For example, a food or household article manufacturer may advertise in magazines distributed only in food stores or in magazines of general interest which are circulated throughout the country from the newsstands and by subscription. Alternately, since the invention is not limited to processing coupons printed on any given weight of paper, it is entirely feasible that publications other than periodicals may carry these coupons. The same ad may likewise appear in different periodicals.

In the sixth space, the time at which the coupon was distributed may be indicated. For example, a large concern when bringing out a new product may run a sales promotion campaign that would extend over several weeks or several months. If a similar coupon is run consecutively for several weeks in a weekly publication, it may be highly desirable for sales purposes to know at what time the new product first came to the attention of the consumer.

It will be understood, however, that the above description of what information may be obtained in the defined area is merely illustrative only in that any particular situation a greater or lesser amount of information, and information of types other than that disclosed here may be utilized. The important point, however, is that in the defined area, which will generally be near the bottom of the page and substantially parallel to the edge of the page, any required information may be imprinted.

It should also be noted that the coded magnetic indicia may be imprinted with conventional magnetic inks such as illustrated in Patent No. 2,694,656. Alternately, instead of using the type of indicia illustrated in FIGURE 2, marginal figures composed of an arrangement of black dots may be utilized. In this instance, a sorter actuated by electric eyes would be utilized.

Because of the characteristics of the machines which are well known for processing magnetic ink coupons, it is not necessary that the edges of the coupon be extremely smooth as with the punched card system. In this instance, the edges are indicated as quite rough, as can be seen by referring to areas 32 and 33 which show, respectively, the fuzz or edge left between adjacent perforations which did not rip properly from the magazine.

The process and articles shown herein can be practiced in many ways and can be utilized in many types of printed matter which includes bound periodicals, bound publications, bound catalogs, bound special advertising media, single sheet circulars, advertising media and the like. A wide variety of printing paper can be selected for the printing process with some advantage; it has been, however, shown that particular advantage is realized when the paper has a weight of 40 pounds stock or greater (based on a ream of 500 sheets, 25 inches x 38 inches), the grain of the paper is oriented parallel to the long dimension of the coupon, and the paper is uncoated. These advantages appear in the subsequent sorting of the torn coupons and not in the printing or assembling of the sheets containing the printed coupons.

This application is a contiuation-in-part Serial No. 65,151, filed October 26, 1960, now abandoned.

Although the invention has been illustrated and described in connection with an advertising coupon as used in a periodical, it is not so restricted in application. Accordingly, the scope of the invention should only be limited by the scope of the following appended claims.

We claim:

1. As a new article of manufacture, a periodical having an advertising device relatable to an advertiser, said periodical having a plurality of leaves, said advertising device comprising an additional leaf interposed between said plurality of leaves, said additional leaf having a separable portion, the long dimension of the separable portion lying parallel to the grain of the leaf, said separable portion comprising no more than 50% of the total surface area of the additional leaf and having an indicia receiving area, said indicia receiving area having impressed thereon a set of machine translatable characters, including origin indicating characters, said indicia receiving area being substantially longer than it is high, all of the machine translatable origin indicating characters in said indicia receiving area being aligned with one another within the area, said machine translatable origin indicating characters on the separable portion being of pertinence only to the advertiser associated with the remainder of the additional leaf.

2. The new article of manufacture of claim 1 further characterized in that the machine translatable origin indicating characters are magnetizable.

3. The new article of manufacture of claim 1 further characterized in that the grain of the leaf containing the separable portion is substantially perpendicular to the grain of those leaves immediately adjacent the additional leaf on either side thereof.

4. As a new article of manufacture, an advertising device relatable to an advertiser, said advertising device comprising a leaf having a separable portion, said separable portion comprising no more than 50% of the total surface area of said leaf, said separable portion having an indicia receiving area, said indicia receiving area having impressed thereon a set of machine translatable information yielding characters, said characters being generally in line one with the other, the grain of the leaf lying generally parallel to the line of characters, said machine translatable information yielding characters being of pertinence only to the advertiser associated with the separable portion of the advertising leaf, the balance of the leaf having an advertising message thereon related to the information represented by the set of characters on the separable portion.

*5. The new article of manufacture of claim 4 further characterized in that said separable portion is attached to said leaf by a perforation.*

*6. As an article of manufacture,*

*a mass distribution advertising device relatable to an*

*advertiser for circulation to users in the general public,*

*said advertising device comprising a leaf having a separable portion,*

*said separable portion having an unbroken surface area,*

*said separable portion having an indicia receiving area adjacent one edge of said separable portion,*

*said indicia receiving area having a major and a minor dimension,*

*the major dimension of said indicia receiving area being generally parallel to an edge of said separable portion,*

*said indicia receiving area having impressed thereon a set of machine translatable characters, said characters being generally in line with one another and confined within the indicia receiving area,*

*the grain of the leaf having a nominal orientation with respect to the line of characters throughout the surface area of said separable portion,*

*the machine translatable characters of pertinence to the advertiser associated with the separable portion of the advertising leaf being meaningless to the user,*

*the balance of the leaf having advertising indicia thereon corresponding to at least a portion of the machine translatable characters on the separable portion.*

References Cited by the Examiner

The following references, cited by the Examiner, are of record in the patented file of this patent or the original patent.

UNITED STATES PATENTS

| | | | |
|---|---|---|---|
| 443,296 | 12/1890 | Purdy | 283—58 |
| 3,081,111 | 3/1963 | Kehoe | 282—22 |

OTHER REFERENCES

Suburban Trust Company Disclosure, one page, September 1960.

McCalls Magazine, February 1959, p. 80 and coupon page following p. 80.

LAWRENCE CHARLES, *Primary Examiner.*